United States Patent

[11] 3,586,174

| [72] | Inventor | Arthur M. Hall |
| | | Newton Falls, Ohio |
| [21] | Appl. No. | 861,008 |
| [22] | Filed | Sept. 25, 1969 |
| [45] | Patented | June 22, 1971 |
| [73] | Assignee | The Taylor-Winfield Corporation |
| | | Warren, Ohio |

[54] PARTS TRANSFER MECHANISM
7 Claims, 7 Drawing Figs.

[52] U.S. Cl. .......................................................... 214/1,
198/218
[51] Int. Cl. ............................................................ B65g 25/04
[50] Field of Search .......................................... 214/1 B;
198/218

[56] References Cited
UNITED STATES PATENTS

| 3,262,541 | 7/1966 | De Gain | 198/218 |
| 3,432,042 | 3/1969 | Bautz | 214/1 |

Primary Examiner—Gerald M. Forlenza
Assistant Examiner—George F. Abraham
Attorney—William J. Ruano ABSTRACT: Apparatus for transferring rectangular cabinets, boxes or other workpiece parts of different shapes a variable distance relative to each other so that certain work can be performed on each successive workpiece located at a common station. By means of a single adjustment, the transfer distance of successive workpiece parts is made variable.

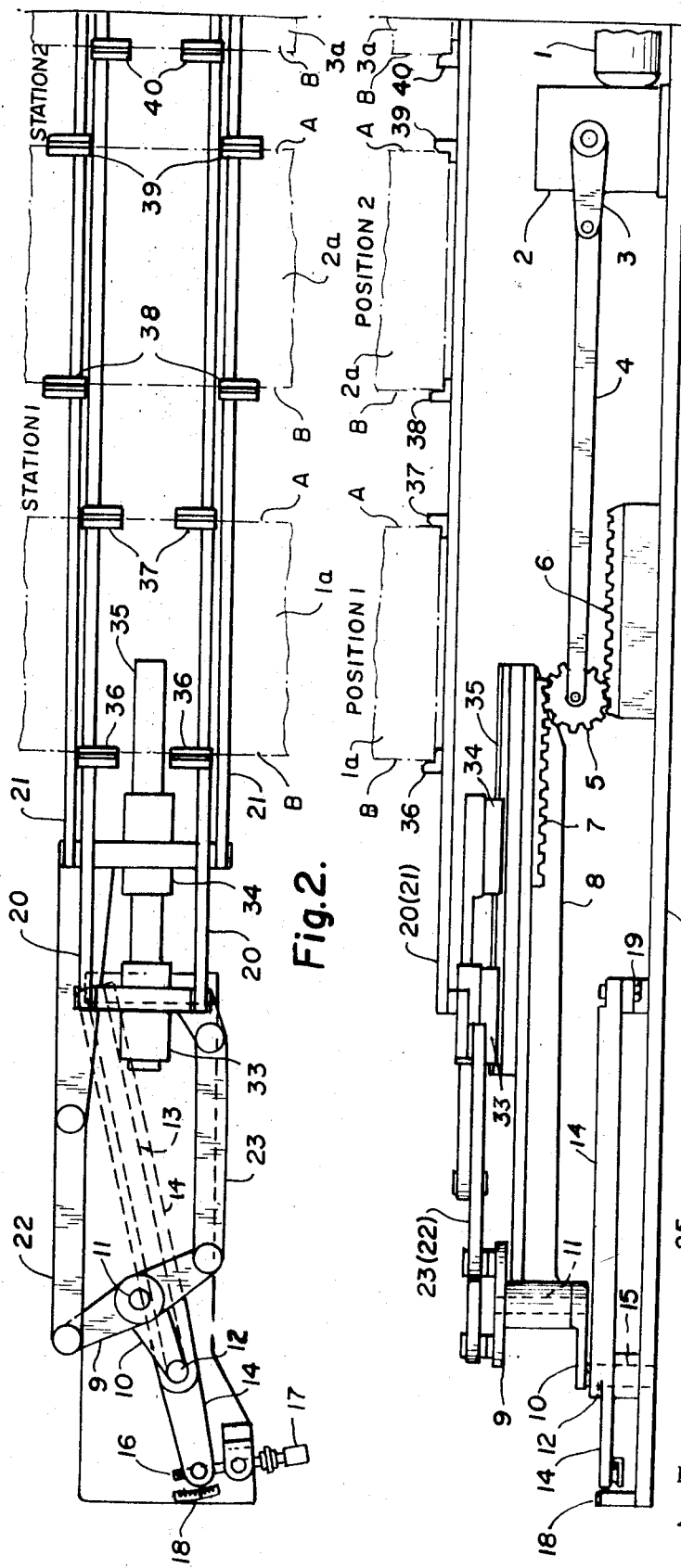

INVENTOR.
ARTHUR M. HALL
BY
his ATTORNEY

PARTS TRANSFER MECHANISM

This invention relates to a parts transfer mechanism and, more particularly, to one including means for providing a variable transfer distance of the various parts.

In transferring cabinets and the like, in presently used transfer mechanism, an outstanding disadvantage has been that when changing the size of the cabinets or other workpieces, numerous adjustments had to be made which are not only time consuming, causing appreciable "down time" but requiring complicated and expensive adjusting mechanisms.

An object of the present invention is to provide a novel parts transfer mechanism which has relatively few parts, compared to commonly used mechanisms and which is devoid of the above named disadvantages, also which enables alternate cabinets or similar workpieces to move a differential distance relative to adjacent cabinets by means of a single adjustment for compensating for changes in the widths of cabinets or other workpieces.

The primary object of this invention is to provide a means for transferring successive workpiece parts, such as appliance, cabinets or boxes, or other workpiece parts of other shapes, a variable distance relative to each other to so position them that certain work can be performed on each successive workpiece located at a common station.

A more specific object is to move alternate workpiece parts, such as cabinets, a differential distance relative to cabinets adjacent thereto.

Another object of this invention is to provide means for stepped or infinite adjustment of the variable transfer distance of successive workpiece parts.

A further object of this invention is to provide means of obtaining smooth acceleration and deceleration of the workpiece part transferring mechanism, which is especially desirable when transferring heavy workpiece parts.

It is a further object of this invention to provide a means to have the transfer distance of successive workpiece parts made variable by means of a single adjustment simultaneous with keeping the start of transfer or workpiece part loading position at a constant point without further adjustment.

Other objects and advantages will become more apparent from a study of the following description taken with the accompanying drawings wherein:

FIG. 1 is an elevational view of the transfer mechanism;

FIG. 2 is a plan view of FIG. 1;

Figure 3:
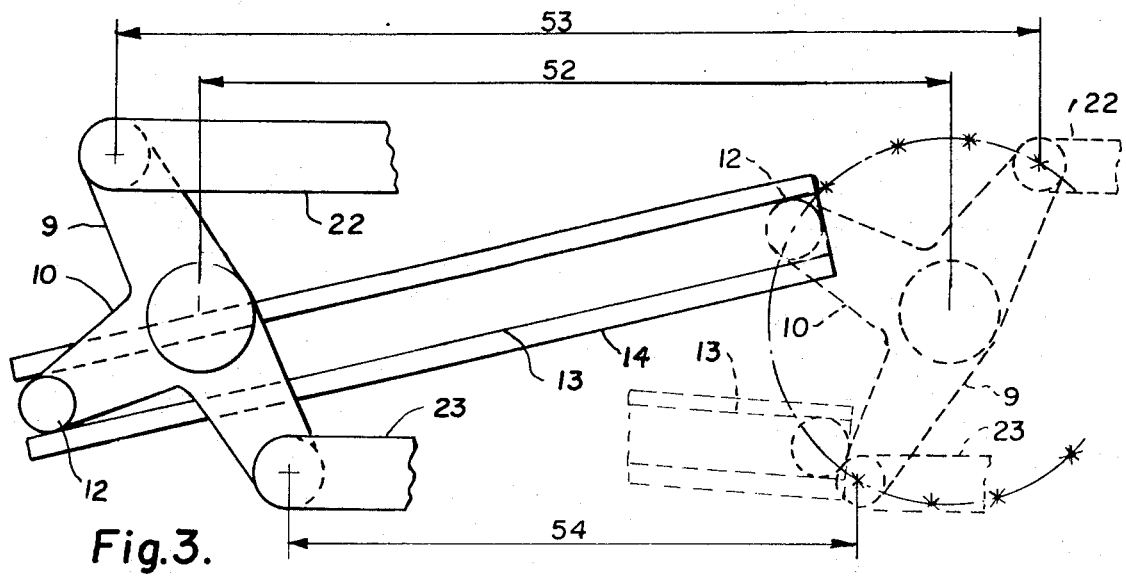

FIG. 3 is an enlarged, diagrammatic view of the transfer motion of rocker arm 9 and lever 10 of FIGS. 1 and 2;

FIGS. 4, 5, 6 and 7 are enlarged views of various modifications of the means for adjusting the differential transfer stroke without disturbing the home or work loading position.

It should be understood that the mechanism shown on the drawing is indicated in the "start of transfer" position. To facilitate the understanding of the mechanism, rectangular boxes are used as the workpiece parts on which work is to be performed on successive pieces at successive stations.

Referring more particularly to FIGS. 1 and 2, movement of workpiece part transfer bars 20 and 21 is accomplished by initiating drive motor 1 which, through gear reducer 2, will turn crank arm 3 connected to link 4 which carries rotating gear 5.

The rolling action of gear 5 moving from left to right between stationary gear rack 6 and rack 7 mounted on carriage 8 will cause the carriage to move from left to right twice the distance of spur gear 5.

Crank arm 3 will rotate through 180° in a clockwise direction and then stop to complete the required harmonic transfer movement 52 of carriage 8 (see FIGS. 2 and 3).

Rocker arm 9 and lever 10 are rigidly mounted to and become part of shaft 11 which rotates in and is carried by carriage 8. Bars 20 are restrained and move in a straight line motion by means of slide 33 actuated by link 23. Bars 21 are likewise restrained and move in a straight line motion by means of slide 34 actuated by link 22. Both of slides 33 and 34 are slideably mounted on slideway 35 which in turn is rigidly mounted on carriage 8.

Mounted at the end of lever 10 is roller 12 which is guided in groove 13 of articulated lever 14. Lever 14 is rotatably mounted at 15 on main stationary frame 50. Lever 14 is arcuately adjusted by means of screw 16 actuated by motor 17. The position of lever 14 is indicated by scale 18. After positioning lever 14, it is more rigidly locked at its far end to main frame 50 by means of clamp bolt 19. It should be here understood that means of adjustment of the arcuate angle of lever 14 could be accomplished in several other ways without changing the scope of the invention.

Rocker arm 9 is connected to transfer bars 21 by link 22, and to transfer bars 20 by link 23.

During the transfer motion of carriage 8, the roller 12, mounted on lever 10, will ride in groove 13 of lever 14 thus causing rotation of rocker arm 9.

Any rotation of rocker arm 9 will introduce movement to transfer bars 20 or 21 independent of the movement of carriage 8, also independent of each other, therefore, the total movement of the transfer bars 20 or 21 could be more or less than the total movement of carriage 8, depending upon the setting of lever 14.

Hereinafter is described alternate methods of obtaining the differential movements of transfer bars 20 and 21 without changing the scope of the invention.

Figures 5, 6, 7:
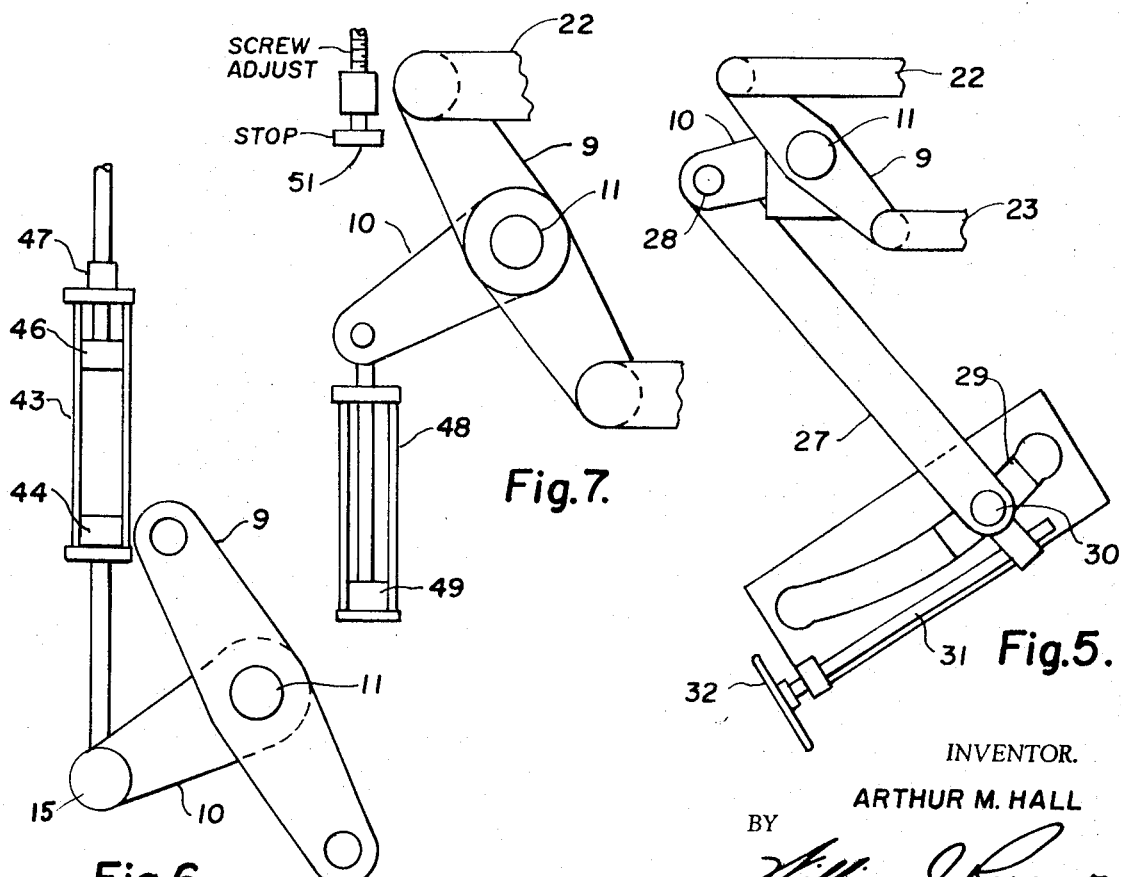

FIG. 4 shows a rotating gear 24 in place of rocker link 9. The motion imparted to gear 24 by lever 10 is imparted to engaged racks 25 and 26 which are connected to transfer bars 20 and 21, thus eliminating links 22 and 23. FIG. 5 shows an alternate method of adjusting the differential stroke between transfer bars 20 and 21. Articulated link 27 can be substituted for lever 14 or FIG. 2. Link 27 is rotatably connected to lever 10 by means of pin 28, and to guide block 29, by means of pin 30. Any movement of carriage 8 will cause articulated link 27 to pivot about pin 30, thus moving pin 28 arcuately, causing lever 10 and rocker arm 9 to rotate, thus creating the differential movement between transfer bars 20 and 21. To vary the differential movement of bars 20 and 21, the position of pivot point 30 is adjusted by means of screw 31 and handwheel 32.

FIG. 6 shows a further modification including an adjustable stroke, dual piston cylinder 43 which can be substituted for lever 14 or 27 to provide the rotating motion to the lever 9 or gear 24 to provide the differential movement of the transfer bars. In this arrangement, the operating piston 44 of cylinder 43 is shown at the extreme bottom end of the cylinder, which is the "home" or work loading position of lever 9. This position remains the same regardless of the differential adjustment which is accomplished by varying the gap between the operating piston 44 and adjustable piston 46, which adjustment is made by nut 47.

FIG. 7 shows a still further modification involving use of a conventional single piston cylinder 48 attached to link 9. Piston 49 is again shown in the home or work loading position. The differential transfer stroke is obtained by adjusting stop 51.

Unlike FIGS. 2 and 5 where the differential transfer movement is energized by the carriage movement, the mechanisms in FIGS. 6 and 7 can be operated independently of carriage movement. This differential movement of transfer can take place at the beginning, at the end, or anytime during the transfer stroke by just energizing the operating cylinder.

In all cases shown in FIGS. 4, 5, 6 and 7, a single adjustment is made to vary the differential transfer stroke, and in all cases the "home" or "work loading position" is not disturbed by said adjustment.

To illustrate the operation of this invention, refer to diagrammatic view FIG. 3.

Assume that the workpiece part on which work is to be done is a cabinet. It should be understood that a production run would entail just one size cabinet. In other words, cabinets of random sizes would not be run simultaneously.

Assume that cabinets are to be run and that work has been done on cabinets at stations 1 and 2 etc., and on areas A and B of adjacent cabinets. The work had been done at an elevation somewhat above the top of locators, such as 36 and 37 (FIG. 2).

In the position shown, all cabinets have been lowered by suitable means, which is not part of this invention and old in the art, into their respective locators 36 and 37, 38 and 39, 40 and 41 (not shown) etc. (FIG. 2) for the full length of the line. Note that locators 36 and 37 and 40 and 41 are carried by transfer bars 20, while locators 38 and 39 and 42 its mate (not shown) are carried by transfer bars 21. The cabinets are all now in position to be transferred, for further work along the line, by the mechanism constituting the invention.

To transfer the cabinets, motor 1 (FIG. 1) is energized, thus actuating gear reducer 2 which rotates crank arm 3 through 180° and then stops. Rotatably fastened to arm 3 is link 4 carrying spur gear 5 which rides on stationary rack 6 and said gear simultaneously engages rack 7 which is fastened to guided carriage 8. With this multiplying arrangement, the carriage stroke will be twice the stroke imparted to the gear 5 by the crank arm 3.

Rocker link 9 and lever 10 are securely fastened to and becomes part of pin 11 which is rotatably carried by carriage 8. Roll 12, carried in the end of arm 10, is in constant engagement with groove 13 in preset and locked lever 14. Transfer bars 20 and 21 are linked to rocker link 9 by means of links 23 and 22, respectively.

Immediately carriage 8 starts to move through its required stroke. It carries with it the rocker link 9 and lever 10 which are indirectly fastened to said carriage 8 by the medium of pin 11. Simultaneous with the carriage movement 52, rocker link 9 rotates in a clockwise manner due to the action of roller 12 restrainably moving in groove 13. Movement of rocker link 9 causes an additional movement of link 22, and transfer 21, thus the total transfer movement 53 of bars 21 equals the carriage movement plus the movement caused by the rotation of the rocker link 9. Meanwhile the same movement or rocker link 9 cause a subtracting movement of links 23 and transfer bars 20, thus the transfer movement 54 of bars 20 equals the carriage movement minus the movement caused by the rotation of rocker link 9. Thus it will be seen why this differential transfer movement is necessary when referred to cabinet position.

The basic requirement is to do work on areas A and B of each individual cabinet. If work on A and B areas of a common cabinet were to be done simultaneously in a single common station, the tooling to perform such work would have to be adjustable for each size cabinet at each station, which is expensive and time consuming. To eliminate this time and expense, resort is made to the practice of doing work on section A of cabinet 1a and on section B of an adjacent cabinet 2a at the same work station. The same general idea holds true at all work stations down the line.

It should be noted that alternate cabinets 1a and 3a are carried by bars 20 and located by means of locators 36—37 and 40, respectively.

Alternate cabinets 2a and 4a (not shown) are carried by bars 21 located by means of locators, such as, 38—39. This alternate progression takes place the full length of the line.

Upon transferring, bars 20 move alternate cabinets 1a and 3a to the positions formerly occupied by alternate cabinets 2a and 4a, therefore area B of cabinet 1a, position 1, will now coincide with the area B of position 2 vacated by cabinet 2a. Simultaneously area B of cabinet 3a, position 3, will now coincide with area B of position 4 vacated by cabinet 4a.

Simultaneous with the movement of the bars 20, the bars 21 will move alternate cabinets 2a and 4a to the position occupied by cabinets 3a and 5a (not shown) therefore the area vacated by cabinet 3a. Simultaneously area A of cabinet 4a, position 4, will coincide with area A of the position vacated by cabinet 5a (not shown).

It can be readily seen that to move area B of cabinet 1a, position 1, to area B of position 2, the transfer stroke of cabinet width plus a constant tooling dimension between adjacent cabinets is required.

Whereas, to move area A of cabinet 2a, position 2, to area A of position 3 required a transfer stroke of cabinet width plus a variable dimension between adjacent cabinets, depending upon cabinet width.

In general words, alternate cabinets move a differential distance relative to the cabinets adjacent to said alternates.

The method of obtaining a differential transfer distance between transfer bars 20 and 21 is the heart of the invention.

There are several ways, in use, for obtaining this differential transfer dimension which has to be changed each time the size of the workpiece changes. All of these "in use" mechanisms have one common fault and that is too many time consuming adjustments have to be made when changing sizes of workpieces. With the mechanisms of the present invention only one adjustment is required when changing workpiece size.

To change the transfer stroke differential with the present mechanism, it is only necessary to make one adjustment by changing the angle of the groove 13 in lever 14 by means of screw 16 as previously explained.

When groove 13 is parallel with the carriage slide the rocker arm 9 will not rotate, therefore, the transfer stroke will equal the carriage stroke and there will be no transfer differential.

Summing up the invention, it will be readily seen that rocker link 9 and its means of adjustment, whether it be the grooved arm 14 or the lever 27, or the mechanisms shown in FIGS. 6 and 7, is really the heart of the invention. Its basic function is to add to or subtract from the carriage stroke to give the required transfer differential.

While I have illustrated and described several modifications of my invention, it will be understood that these are by way of illustration only and that various changes and modifications may be contemplated within the scope of the following claims.

I claim:

1. A dual transfer mechanism for transferring a plurality of pairs of workpieces to successive longitudinally spaced stations comprising a first carrier for carrying a plurality of longitudinally spaced workpieces, a second carrier, for carrying a second plurality of longitudinally spaced workpieces which alternate with the workpieces of said first means for driving both said carriers simultaneously longitudinally, means for providing a relative differential movement between the carriers including a single adjusting means for adjustably coupling said carriers for adjusting the differential movement of said second carrier relative to said first carrier.

2. Apparatus as recited in claim 1 wherein said single adjusting means comprises an adjustably rotatable element which rotates a predetermined adjustable amount in response to movements of said carriers for adjusting the differential movement of said carriers.

3. Apparatus as recited in claim 1 wherein said adjustable means comprises a level having one end connected to said first carrier and the other end connected to said second carrier, and guide means for varying the extent of rotation of said level in response to longitudinal indexing movement of said carriers for varying the relative distance of movement of said carriers.

4. Apparatus as recited in claim 1 wherein said means comprises a pair of racks, one connected to each of said carriers, and a spur gear in meshing relationship with said racks, together with means for adjustably varying the extent of rotation of said spur gear.

5. Apparatus as recited in claim 1 together with track means for guiding said lever in response to longitudinal movements of said carriers, and means for adjusting the angularity of said track means for adjusting the extent of rotation of said lever.

6. Apparatus as recited in claim 1 together with fluid operated actuating means for adjusting the angularity of said lever for adjusting the differential movement of said carriers.

7. Apparatus as recited in claim 1 wherein said first carrier is in the "home" or work loading position and is unaffected by adjustments of the differential transfer stroke of said second carrier by varying said single adjusting means.